Figure 7:
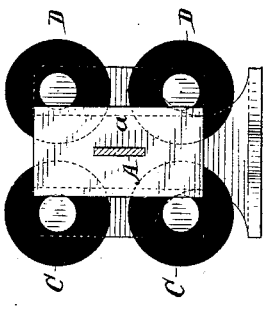

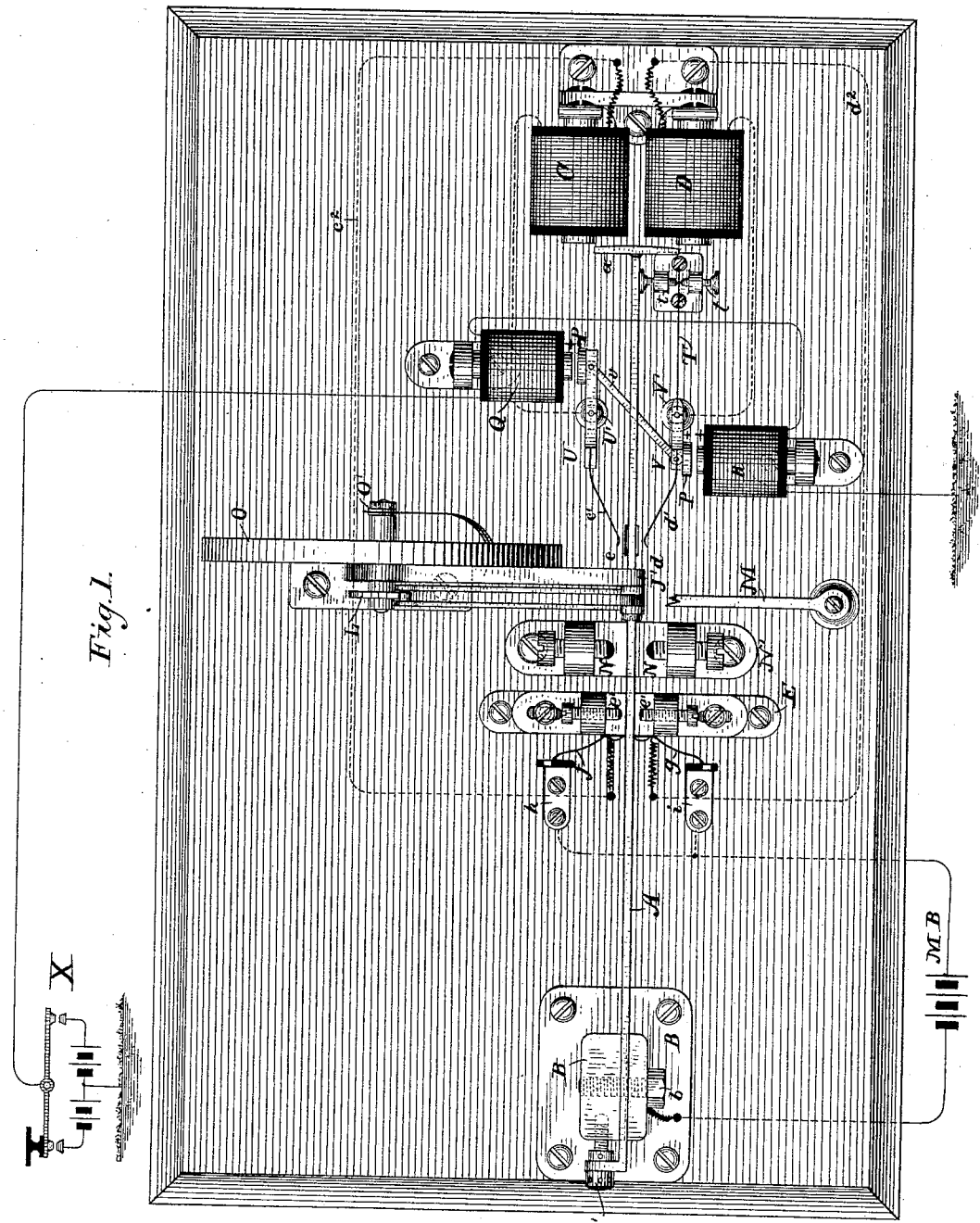

(No Model.) 4 Sheets—Sheet 2.
A. L. PARCELLE.
VIBRATING ELECTRIC MOTOR
No. 324,152. Patented Aug. 11, 1885.
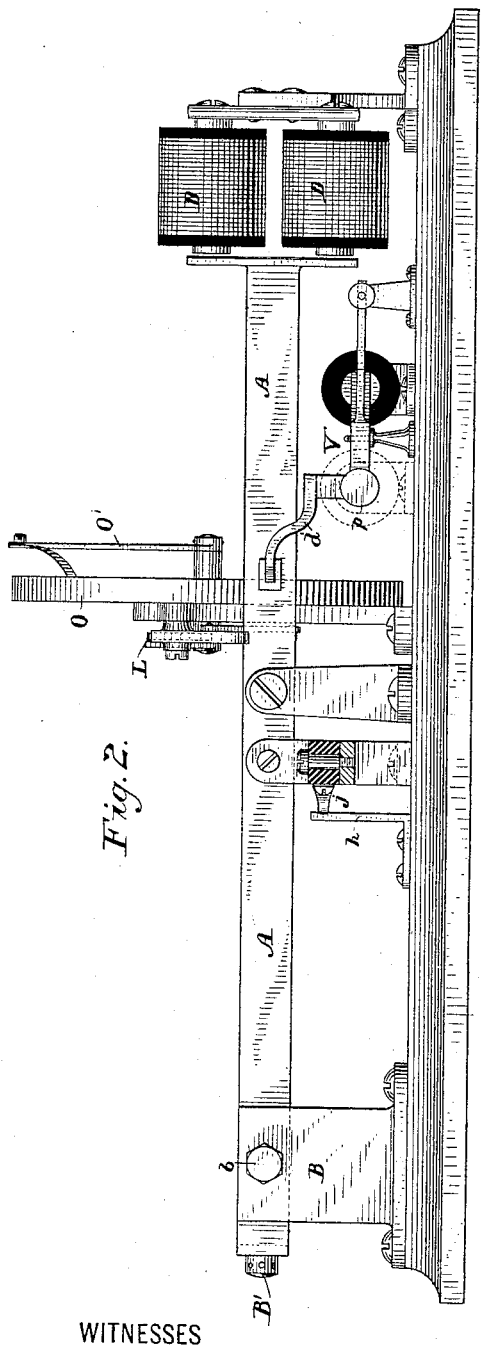
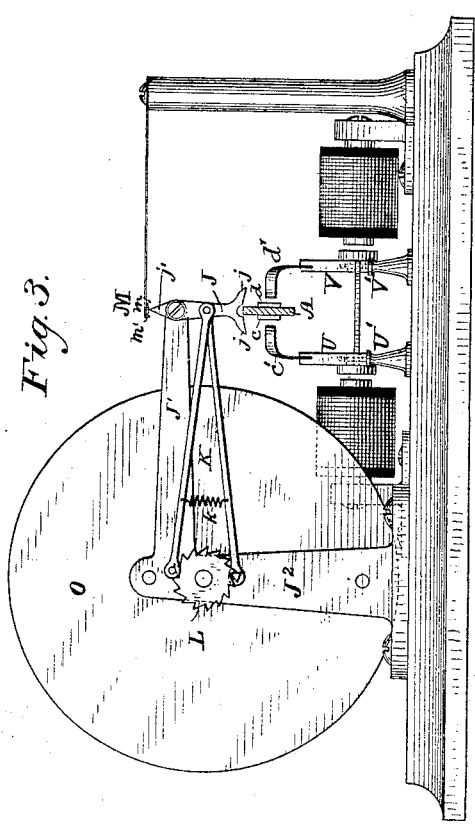
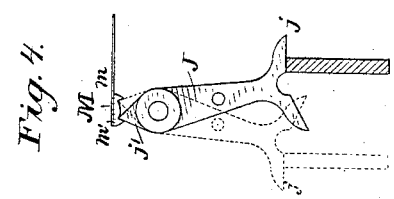
WITNESSES
INVENTOR
Albert L. Parcelle
By his Attorneys, (No Model.) 4 Sheets—Sheet 3.

A. L. PARCELLE.
VIBRATING ELECTRIC MOTOR.

No. 324,152. Patented Aug. 11, 1885.

WITNESSES
Wm A. Skinkle
H. W. Elmore.

INVENTOR
Albert L. Parcelle
By his Attorneys.
Baldwin, Hopkins & Peyton (No Model.)

A. L. PARCELLE.

VIBRATING ELECTRIC MOTOR

No. 324,152.

4 Sheets—Sheet 4.

Patented Aug. 11, 1885.

UNITED STATES PATENT OFFICE.

ALBERT L. PARCELLE, OF BOSTON, MASSACHUSETTS, ASSIGNOR TO THE NATIONAL ELECTRICAL COMPANY, OF NEW YORK, N. Y.

VIBRATING ELECTRIC MOTOR.

SPECIFICATION forming part of Letters Patent No. 324,152, dated August 11, 1885.

Application filed September 1, 1884. (No model.)

*To all whom it may concern:*

Be it known that I, ALBERT L. PARCELLE, of Boston, in the county of Suffolk and State of Massachusetts, have invented an Improved Vibrating Electric Motor, of which the following is a specification.

The primary object of my invention is to provide a motor adapted especially for use in connection with electrical synchronous movements, printing telegraphs, or other apparatus where uniform rates of speed are desirable; and my improved instrument may be used either directly as a motor to actuate such apparatus step by step, or as a circuit-interrupter to control other devices for driving the apparatus. With this object in view I preferably employ a resilient vibrator, and, preferably, one capable of a greater amplitude of motion, and having a normally lower rate of vibration than the ordinary electrically-actuated vibrators, either harmonic or non-harmonic, so well known in the art. This vibrator may consist of a spring-tongue, reed, or bar, or of a pivoted non-resilient bar, provided with supplementary opposing springs, and may be of any suitable or desirable material. The armature upon which the motor-magnets act is located upon the end of the vibrator, and lies in a plane transverse to its longitudinal axis. The motor or vibrator magnets are arranged opposite the armature with the faces of their poles in a plane parallel or substantially parallel therewith, so that the armature vibrates across the faces of the magnets. The local circuits through the motor-magnets are opened and closed by the vibrator in its movement, as is well understood. The power of the motor-magnets is therefore all applied to the vibrator at the same distance from the center of vibration—that is, always at the extreme end of the vibrator—and the vibrations are regular, equal, and uniform.

I am aware that heretofore it has been proposed to actuate a harmonic vibrator by horseshoe-magnets, one magnet being arranged on each side of the vibrator with its faces in a plane parallel with the vibrator; and I do not therefore claim such an arrangement, broadly. So far, however, as the arrangement of the motor-magnets is concerned, the invention is not limited in its broadest sense to a resilient vibrator; and so far as the switch devices and contacts for causing the actuation of the vibrator are concerned, the invention is not limited to any particular character of vibrator, or to any particular arrangement of the motor-magnets.

Figure 8:
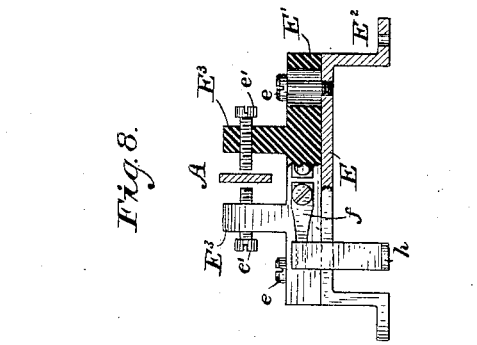
Figure 6:
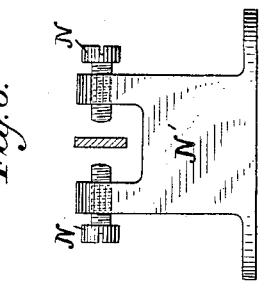
Figure 10:
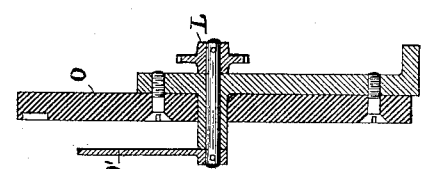
Figure 5:
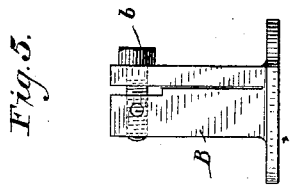
Figure 9:
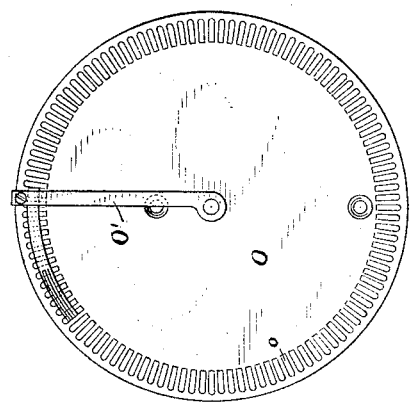
Figure 11:
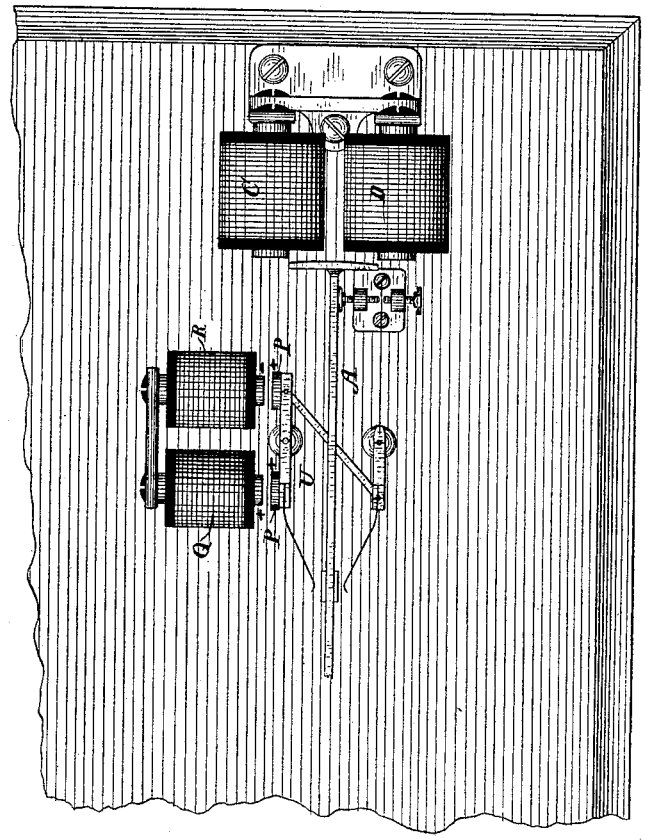

In the accompanying drawings, Figure 1 is a plan view of my improved instrument; Fig. 2, a side elevation, partly in section; Fig. 3, a transverse section; Fig. 4, a detail view showing one form of device by which the vibration of the armature is utilized to actuate devices. Fig. 5 is a detail view illustrating the construction of the block in which the heel of the vibrator is mounted. Fig. 6 is a detail view illustrating the stops for limiting motion of the vibrator. Fig. 7 is a detail view showing the relation of the armature on the end of the vibrator to the motor-magnets. Fig. 8 is a detail view, partly in section, illustrating the switch devices by which the circuits of the motor-magnets are made and broken by the vibrator in its movement. Figs. 9 and 10 are detail views illustrating one application of the motor—viz., for the purpose of driving a trailing-arm or circuit-completer over a table of contacts. Fig. 11 is a detail view showing a modified arrangement for stopping and starting the motor from a distant station.

A vibrator, A, of suitable length, width, and thickness—say about the proportions illustrated in the drawings—is mounted in a block or post, B, secured upon the bed-plate. This block is preferably metallic, and is preferably split and socketed for the reception of the vibrator, and is provided with a clamp-screw, $b$, for securely holding the vibrator. I prefer to employ a metallic block or one in which the clamping-jaws which hold the vibrator are faced with metal, so as to afford a firm support to the vibrator. The supporting-block is illustrated in detail in Fig. 5. In Fig. 1 the vibrator A is shown as clamped in the block B, and it will be seen that the bent end of the vibrator slides on a bolt, B', secured in the block B, which bolt is provided with reverse adjusting-screws. By loosening the bolt $b$, therefore, the vibrator may be adjusted endwise in the block, so as to vary its normal rate of vibration, as is well understood. Any other suitable manner of supporting the vibrator or adjusting it, where adjustment is desired, may of course be employed.

As before remarked, the vibrator A may be of any suitable resilient material, and the soft-iron armature $a$ secured upon its end; or it may be formed of one piece of steel or suitable iron, such as cold-rolled iron. The armature $a$ is preferably rectangular, as clearly illustrated in Fig. 7.

The motor-magnets C C and D D are arranged opposite the face of the armature in a plane substantially parallel therewith. The magnet D is placed on one side of the center of vibration and the magnet C on the other, with the two poles of each magnet in the same vertical line. I have shown horseshoe-magnets D D arranged with both poles to act upon the armature of the vibrator, but obviously a single magnetic pole on each side of the center of vibration may be employed.

Platinum contact-plates $c$ $d$ are placed on the opposite sides of the vibrator at some suitable point in its length to make contact with spring-fingers $c'$ and $d'$ for completing the local circuits of the motor-magnets C D, as is presently described.

A switch or circuit-changer, E, placed at any suitable point in the length of the vibrator is also employed to control the circuits of the motor-magnets, and is preferably constructed in the following manner, though of course any other practical construction will answer the purpose.

A sliding switch-block, E', Fig. 8, is mounted upon a bracket or support, E², secured upon the bed-plate, the sliding-block being guided and limited in its movement by two screws, $e$, which pass through slots in the block, and are secured to the bracket E². Two uprights or posts, E³, on the sliding block are provided with adjusting-screws $e'$, between which the vibrator A is located. As the vibrator moves, therefore, the sliding block E' is shifted first to one side and then to the other, and the exact moment of its movement may be regulated by the adjusting-screws $e'$.

The sliding block carries two contact-fingers, $f$ $g$, which make and break contact with contact-posts $h$ $i$ as the vibrator in moving back and forth shifts the switch-block E'. One pole of the motor-battery MB is connected with the heel of the vibrator. From thence the circuit is continued either through the body of the vibrator, or through a suitable conducting-strip thereon when the vibrator is made of non-conducting material, to the platinum contacts $c$ $d$, thence by either the spring $c'$ or $d'$ through the coils of either magnets C or D, and thence to either of the contact-fingers $f$ or $g$, and its contact-post $h$ or $i$ to the opposite pole of the battery. The circuit-wires are indicated by dotted lines, and the connections are sufficiently clear without detailed description.

The contact-fingers $c'$ $d'$ are shown in this instance as mounted upon pivoted arms U V, carried on posts U' V', for a purpose hereinafter described, and the circuits are completed through the contact-finger $c'$ or $d'$, pivoted arm U or V, to the coil of the magnet C or D. The parts are all shown at rest on the center of motion.

In starting the motor into operation an impulse of vibration may be imparted to it by the hand of the operator. Assuming that the vibrator is moved to the right toward and across the poles of the magnet D, the contact $d$ will make contact with the finger $d'$ before the contact-finger $g$ of the switch devices has left the conducting-face of the post $i$. The circuit, therefore, will be briefly completed from the motor-battery MB through the vibrator-contact $d$, finger $d'$, pivoted arm V, coils of magnet D, thence by wire $d^2$ to finger $g$, contact-post $i$, and opposite pole of the battery, and the armature $a$ will be attracted. The continued movement of the vibrator in that direction opens the circuit just described by the shifting of the block E', so as to move the finger $g$ out of contact with the conducting-face of the post $i$, and make contact between $f$ and $h$. The vibrator being released from magnetic attraction on that side of its center of vibration will by its resilience spring back, and, passing the center of vibration, will make contact between the contact-plate $c$ and finger $c'$, and finger $f$ and conducting-face of post $h$, thus completing the motor-circuit through the coils of the magnet C, and the armature will be attracted toward and across the face of its poles. This circuit runs from the battery through the vibrator, contact $c$, finger $c'$, pivoted arm U, coils of magnet C, line $c^2$ to finger $f$, and contact-post $h$ to the opposite pole of the battery, and the circuit remains unbroken until the finger $f$ has been moved out of contact with the post $h$ by the shifting of the sliding block E'. This operation continues, the armature being attracted first toward and across the poles of one magnet, and then toward those of the other.

Shunts and resistances may be employed, as usual, in this class of apparatus to prevent sparking at the contacts, if desired.

When the switch E is in the central position, as shown in Fig. 1, then one finger, $g$, is just on the inner edge of the conducting-face of its post $i$, and the finger $f$ is just off the inner edge of the conducting-face of its post $h$. The movement of the vibrator downward or to the right, as viewed in the figure, will therefore for a time complete the circuit of magnet D, as described, until the switch E reaches the end of its movement and carries the finger $g$ off the conducting-face of post $i$. The vibrator now moves in the opposite direction by its own resilience, the switch remaining stationary until the vibrator comes against the upper or left-hand screw, $e'$. The switch is then moved until the finger $f$ comes on the conducting-face of its post $h$, and the vibrator having some time before left the contact $d$, and made contact with $c$, the circuit of magnet C will be completed.

It will be perceived that the attracting power of the motor-magnets is always applied at the same point—viz., the extreme end of the vibrator—thus insuring a more even and regular vibration than where the two poles of the vibrator-magnets are placed, so as to act on the sides of the vibrator, as in that case there are two points in the length of the vibrator at which the motive power is applied. Under my organization the whole force of the battery is made available, the attraction of the motor-magnets is applied at the most effective point of the vibration, and no current is used during the middle portion of the swing or vibration, the resilience of the vibrator serving to carry it past the dead-point. An increased current in the motor-circuit will give a greater amplitude of motion to the vibrator, because the more intense the magnetic attraction is, the more energy will be imparted to the vibrator, and it will move a greater distance across the poles of the motor-magnets from the center of vibration.

Where some means of adjusting the vibrator in its support to vary its normal rate is used, as described, the frame carrying the motor-magnets may also be provided with some means of adjustment to compensate for the movement of the vibrator, and maintain the poles of the magnet and the armature in the same relation.

The pivoted arms U and V are connected by a cross arm, $v$, pivoted to the arms U and V on opposite sides of their pivots, and at equal distances therefrom. The result of this construction is that the movement of either of the arms so as to move its contact-finger toward or from the contact on the vibrator, produces a corresponding and equal motion of the other arm for the same purpose.

The end of the arm V, which projects beyond its post $V'$, carries a spring-tongue, T, which lies between two adjusting-screws, $t\ t$, carried in a suitable bracket secured to the bed-plate. By the adjustment of these screws, therefore, the spring T may be moved so as to adjust the contact-fingers $c'\ d'$ toward or from their contacts on the vibrator. The arrangement of pivoted arms U V, however, has another purpose, which is described hereinafter.

The instrument which I have now described may be used as a circuit-interrupter for what is known as the "phonic wheel" of Poul la Cour, or for the purpose of interrupting any other circuit for driving telegraphic or other apparatus. Aside from this use, however, the motion of the vibrator itself may be directly utilized as a motive power. One form of an organization for this purpose is illustrated in the drawings. (See more especially Figs. 2, 3, and 4.) The vibrator A is here shown as rocking an anchor-lever, J, back and forth in its vibration. This lever is shown as pivoted in a horizontal arm, $J'$, of a standard, $J^2$, mounted on the bed-plate. The lower end of the anchor-lever on which the vibrator acts is notched and provided with elongated inclined lateral extensions $j\ j$, which serve as guides or guards to prevent the vibrator from swinging free of the anchor-lever, and thus insure its actuation alternately in opposite directions as the vibrator vibrates; but such extensions are not necessary.

Pitmen or push-and-pull arms K, pivoted on the anchor-lever, carry pawls or teeth, which work in the teeth of a ratchet-wheel, L, having its bearing in the standard $J^2$. The rocking of the anchor-lever J by the vibrator therefore causes an intermittent or step by step rotation of the ratchet-wheel L. The pitmen K are connected by coil-spring $k$, which tends normally to draw them together and hold their pawls in contact with the teeth of the ratchet-wheel. The upper end, $j'$, of the anchor-lever is wedge shape, and works against a yielding device, M, which is provided with two depressions or notches, $m$, which hold the wedge-shaped end of the anchor-lever at the limit of its movement on each side until positively actuated in the opposite direction by the swinging of the vibrator. I may also use, in connection with the anchor-lever, adjustable stops N, carried in a block, $N'$, mounted on the bed-plate, to limit the motion of the vibrator, so as to always prevent its swinging beyond the lateral extensions $j$ of the anchor-lever, and obviate the possible accident of the vibrator on its return motion, striking against the edge of the lateral extension $j$ instead of passing under it. The adjustable stops, however, which are illustrated in Figs. 1 and 6, are only probably desirable or useful when the inclined extensions $j$ are not used on the anchor-lever, because the extensions can always be made of sufficient length to render it impossible for the vibrator to pass beyond them. They are not necessary, however, in either case, and I may or may not employ them.

In practice I would prefer to place the stops, as well as the contacts $c\ d$, nearer the heel of the vibrator; and I here remark that the different parts may be located at any point in the length of the vibrator found most suitable for the purpose.

As to the speed of vibration, I have found that an instrument constructed to vibrate at about thirty per second operates most satisfactorily. With fifteen teeth in the wheel L this would give a speed of rotation of about four times per second, because the pitmen both push and pull. A slower rate for the vibrator, a larger wheel with more teeth, or an actuation of the wheel by one pitman only, may be adopted when a slower speed of rotation is desired. Of course any suitable rate of vibration of the vibrator, and any suitable means for actuating the driven apparatus by it, may be adopted.

I have shown in the drawings a circular table, O, on which a circular series of insulated contacts, $o'$, are placed. This table is supported on the standard $J^2$ concentrically with the axis of the ratchet-wheel L, the axle of which passes through it, and carries on its outer end a radial arm, $O'$, provided with a trailing brush or finger which sweeps over the contacts. Such an arrangement may be adopted in synchronous or printing telegraphs for the distribution or subdivision of an electric circuit according to any of the well-known systems. It is shown and described here as one application of my instrument as a motor power.

Under some circumstances it would be desirable to have the motor under control at a distant station. I have therefore provided an arrangement by which motors may be stopped and started from a distance. In Fig. 1, for instance, the arms U V are magnetic and carry polarized armature-pieces P P on their outer sides, the armature of the arm U being placed on the opposite end from the contact-finger $c'$, while the armature of the arm V is placed on the same end with the contact-finger $d'$. Opposite these armatures, electro-magnets Q R are placed and connected with a line from a distant station, X. At this station a key and split battery are located. The magnets Q R are so wound that a current of one polarity would cause the magnet Q to attract its armature, and the magnet R to repel its armature, so that both magnets would act conjointly and equally, because connected by the link $v$, to move both contact-fingers $c'$ $d'$ against the contact-plates $c$ $d$ on the vibrator. When the fingers $c'$ $d'$ are so put in contact with the plates on the vibrator, the motor-circuit through either the coils of the magnet C or of the magnet D will be completed. Which of the two magnets will be energized depends upon the contacts at the switch E. If the finger $f$ is in contact with the post $h$, the magnet C will be energized, and if the finger $g$ is in contact with the post $i$, the magnet D will be energized. There will always be a completion of the circuit through either the contact $f$ or $g$, and as contact is completed at both $c'$ and $d'$, the motor will always be started when an impulse of electricity of a polarity to produce the movements of the fingers $c'$ $d'$ is transmitted. When it is desired to stop the motor, a current of opposite polarity is transmitted from the distant station, and this current, acting in a reverse manner on the armatures P P from that described, draws the contact-fingers $c'$ $d'$ apart, so that the vibrator cannot make proper contact with them, and the motor will, therefore, come to rest.

With the switch in the position shown, in starting the motor as above described, the circuit of magnet D would be completed. If from any cause, the switch were moved so that $f$ and $h$ would be in contact, then the circuit of magnet C would be completed. Should the construction be such that the fingers $f$ $g$ are both in contact with their posts when the switch is in the central position, then the circuit of both magnets would be completed. In that event the difference of current in the two circuits, or the difference which would ordinarily exist between the two magnets C D, would cause a jerk of the armature sufficient to impart the necessary initial vibration.

In Fig. 11 I have shown a somewhat modified construction for accomplishing the same purpose. There, instead of having an armature on each of the pivoted arms, both armatures are placed upon the arm U, and a horseshoe magnet, Q R, placed so that a current of one polarity will attract one armature and repel the other, and a current of reverse polarity will reverse the conditions of retraction and repulsion. The operation is precisely the same in principle, and will be well understood.

Instead of employing polarized armatures in the manner just described, it is of course obvious that a polarized relay may be used at the motor to open and close the local circuit or circuits to give the required movement to the contact-fingers. It is also obvious that either of these arrangements could be employed to start and stop the motor locally.

I have shown and described my improved motor as organized in what I deem to be an efficient, practical, and desirable manner; but of course there are many details that might be changed or modified without departing from the broader features of the invention.

I have said at the beginning of this specification that my motor was primarily intended for use in connection with electrical synchronous movements, printing-telegraphs, &c. It has, however, a much wider application, and may be used as an ordinary motor for driving machinery, for, obviously, by enlarging the parts and increasing the electromagnetic power of the motor-magnets, the motor may be driven with an energy sufficiently great to be measured by horse-power.

What I claim is—

1. The combination of an electrically-actuated vibrator, the vibrator-magnets having their poles arranged opposite the end of said vibrator outside the curve of vibration, and in a plane transverse to its longitudinal axis, a source of electric energy, and electric circuits and connections.

2. The combination of an electrically actuated vibrator, an armature on the end thereof lying in a plane substantially at right angles to the longitudinal axis of the vibrator, vibrator-magnets having their poles arranged opposite said armature outside the curve of vibration and in a plane substantially parallel therewith, a source of electric energy, and electric circuits and connections.

3. The combination of an electrically-actuated vibrator, vibrator-magnets, a source of electric energy and circuits, circuit-completing devices by which the circuits of the motor-magnets are alternately completed as the vibrator vibrates, and additional circuit-completing or switch devices actuated by the vibrator to alternately close the circuit of one motor-magnet and open that of the other, as set forth.

4. The combination, substantially as set forth, of an electrically-actuated vibrator, its motor-magnets, source of electric energy and circuits, and the anchor-lever which is struck by the vibrator and moved in both directions.

5. The combination, substantially as set forth, of an electrically-actuated vibrator, its motor-magnets, source of electric energy and circuits, the anchor-lever rocked by the vibrator, and a yielding device, M, for steadying the anchor-lever.

6. The combination of an electrically-actuated vibrator, its motor-magnets having their poles arranged opposite the end of the vibrator in a plane transverse to its longitudinal axis and outside of its curve of vibration, a source of electric energy, circuits and connections, and devices mechanically actuated by the vibrator.

7. The combination of an electric motor, a distant source of electric energy, and a key or manual current-transmitting device operated at will, electro-magnetic controlling devices at the motor in the circuit of the distant source of energy for throwing the local electro-motive power of said motor into and out of action at will, when an impulse from the distant source of energy is received at the motor, and independent local motor-driving devices for continuously actuating the motor when once started until a stopping impulse is received from the distant source of energy to throw the local electric motor-driving devices out of action.

8. The combination of an electrically-actuated vibrator, its motor-magnets, source of electric energy and circuits, contacts $c'\ d'$, the electro-magnets for moving said contacts to start and stop the motor, and suitable switch devices E.

9. The combination of the vibrator, its motor-magnets, the contact-fingers $c'\ d'$, the pivoted arms on which they are mounted, the link $v$, and the spring which tends constantly to keep the contact-fingers in their proper normal position.

10. The combination of a vibrator, its motor-magnets, the contact-fingers $c'\ d'$, the pivoted arms on which they are mounted, the pivoted link which connects said arms, the controlling-magnets which operate upon said arms to move the contact-fingers $c'\ d'$ toward or from the vibrator, and the spring which tends to restore them to their proper and normal position.

11. The combination of an electrically-actuated vibrator, its split or two-part support, a screw, $B'$, for adjusting the vibrator endwise in its support to vary its normal rate of vibration, and a clamp-screw, $b$, for clamping the vibrator firmly in its adjusted position.

In testimony whereof I have hereunto subscribed my name.

ALBERT L. PARCELLE.

Witnesses:
  A. B. COFFIN,
  COLEMAN MANNING.